Patented Aug. 10, 1954

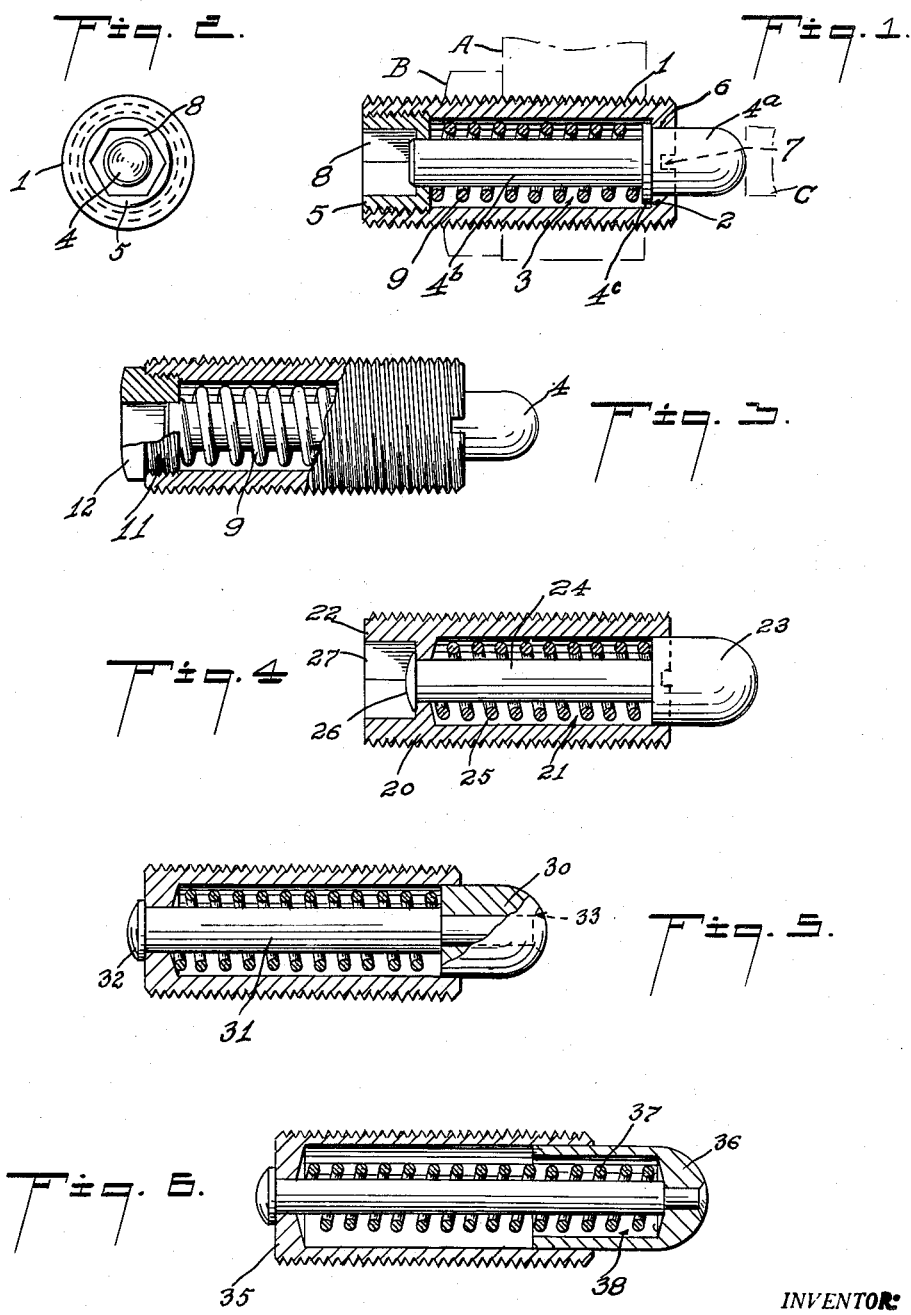

2,685,824

UNITED STATES PATENT OFFICE 2,685,824

PRESSURE CONTROLLED LOCATING DEVICE

William Lewis Coop, deceased, late of Hawthorne, Calif., by Agnes Moran Coop, administratrix, Hawthorne, Calif.

Application November 3, 1951, Serial No. 254,766

2 Claims. (Cl. 90—59)

This invention relates to a pressure controlled device for locating parts to be machined within jigs, fixtures and other tools. In mounting parts to be machined within such tools, it is generally found that very limited space is available for placing the device in operative position in or on the tool in correct relation to the part to be machined. In addition, it is essential that a predetermined amount of pressure be applied to the part in order securely to maintain it in correct position during the machining operation.

It is, in view of the foregoing, the object of the present invention to provide a locating device in the form of a cylindrical body within which a spring actuated plunger is mounted for axial movement. It is a further object to provide a locating device, the body of which is adapted for axial adjustment relative to the tool supporting it. Another object is the provision of a locating device designed and shaped to accommodate a relatively very long spring of the largest possible diameter to the end that the spring pressure against the part to be machined may remain substantially uniform within the limits of extent of adjustment of the device and extent of compression of the spring. A still further object is to provide an extremely compact locating device of very few parts and of inexpensive construction.

These and other objects of the invention, as well as the many advantageous features thereof will be appreciated upon perusal of the following detailed description and by referring to the accompanying drawing in which preferred forms of the invention are illustrated.

In the drawings:

Fig. 1 is a cross sectional view through the center of a locating device embodying the invention;

Fig. 2 is a substantially corresponding end view of the device;

Fig. 3 illustrates a somewhat modified form of the invention;

Figs. 4 and 5 show further modifications of the invention; and

Fig. 6 illustrates the manner in which the device may be designed to accommodate a larger and longer spring.

The device of Fig. 1 includes a tubular, cylindrical body or sleeve 1, in the passage through which, at the front end thereof, is placed a shoulder 2. The space within the sleeve, behind this shoulder, forms a cylindrical chamber 3. The outer cylindrical surface of the sleeve is provided with screw threads throughout the length thereof. A plunger 4 is made from cylindrical stock of a diameter slidably to fit within this chamber and the front end 4ᵃ of the plunger is somewhat reduced in diameter fittingly to ride in a passage 6 through this shoulder. The rear end of the plunger is further reduced in diameter to form a stem 4ᵇ. In the rear end of the sleeve are cut screw threads of a diameter to receive therein a threaded bushing 5 which also is perforated axially to receive the rear end of the plunger stem. Before this bushing is placed in position, it is required to mount a compression spring 9 on the stem of the plunger. A slot 7 is sunk into the forward end of the sleeve of a size to accommodate a spanner wrench and, when the rear end of the passage through the bushing 5 is enlarged to form a hexagonal seat 8, a socket wrench may be applied to this seat and operated in conjunction with the spanner wrench tightly to lock the parts in position about the spring. The device may then be seated in screwthreads of a lug A or other portion of the tool which the device is designed to serve.

It is important to note that the device may be axially adjusted within this part of the tool by applying the spanner wrench to the slot 7 to turn the sleeve in the threads thereof. To lock the device in adjusted position, it is merely required tightly to seat a lock nut B on the threads of the sleeve against the side surface of the lug A. Since the assembled parts of the device merely are required to withstand the pressure exerted by the spring when compressed to locate the part to be machined, it is seen that the thickness of the shoulder 2, the depth of the bushing recess 8 and the thickness of the shoulder 4ᶜ between the head and stem of the plunger can be so greatly reduced that space is provided therebetween for a relatively very long spring.

In the structure illustrated in Fig. 3, the sleeve 1, plunger 4 and spring 9 may all remain unchanged. Only the bushing 11 is different in that it is provided with a hexagonal head 12 seating against the outer end of the sleeve. This form of the invention may be used in cases where sufficient clearance beyond the rear end of the device is available. Since the threaded part of the bushing now can be made shorter, it is seen that a longer spring may be used.

The device of the invention may be considerably simplified by entirely omitting the above described bushings. Such modified combination is in Fig. 4 shown to comprise a cylindrical sleeve 20 having one end closed to form a cylindrical chamber 21 slidingly to receive therein the head 23 of a plunger 24. A spring 25 is placed on the stem of the plunger which thereupon is pushed into the chamber 21 to cause the free end of the stem to pass through a perforation of the closed end 22 of the sleeve. When the rearward movement of the plunger is continued until the end of the stem projects beyond the rear end of the sleeve, it is found the end of the stem can be peened, flattened or otherwise upset to form a knob 26 which is slightly larger than the passage in which the stem rides. This knob serves to limit forward movement of the plunger. The rear end of the sleeve is shown recessed to provide a hexagonal socket 27, similar to the socket 8 above referred to. It is important to note that this type of device only requires three parts namely the sleeve, the plunger and the spring. And where sufficient clearance is available behind the sleeve, it is also possible to eliminate the socket 27. Such modified and simplified combination is illustrated in Fig. 5. The plunger may remain substantially unchanged, or it may be made in two parts, the larger part forming the plunger head 30 which is axially perforated tightly to receive therein the end of the stem 31. The latter is at its rear end made with a small head 32 engaging the rear surface of the sleeve to check forward movement of the plunger. When the entrance to the plunger head perforation is slightly counter-sunk, as indicated at 33, it is merely required lightly to peen the end of the stem at this point securely to tie the head and stem together.

The importance of providing an extremely compact locating device to fit within the very limited spaces ordinarily found in jigs and fixtures was above pointed out and is again emphasized and, in the devices above described, ample space is provided within the sleeves for the length and diameter of the springs. However, where space enough is present to permit of increasing the diameter of the sleeve, it is possible to design the parts in such a manner that the length of the spring may be increased and even more uniform tension obtained. Such modified form of the invention is in Fig. 6 shown to comprise a sleeve 35 which may remain unchanged except that the diameter of the sleeve is increased. The plunger head 36 is in this case shown recessed at 38 to receive the forward end of the spring 37. The stem and the manner of anchoring the stem in the plunger head may also remain substantially unchanged.

What is claimed is:

1. A pressure controlled part locating device comprising, a tubular body externally threaded throughout its length and having an inwardly projecting shoulder in the passage through the body at the front end thereof, the other end of the passage being internally threaded, a bushing seated in the internal threads of the passage, a plunger having a head slidably seated within the shoulder of said passage, the portion of the plunger behind the head thereof being reduced in diameter to form a stem slidably seated within the bushing of the passage, a compression spring on the stem urging outward projecting movement of the plunger head, and means within the body for limiting said outwardly projecting movement of the plunger head, the stem of the plunger being of a length never to project beyond the rear end of the body.

2. A pressure controlled part locating device comprising, a tubular body externally threaded throughout its length and having an inwardly projecting shoulder in the passage through the body at the front end thereof, the outer end of the shoulder being recessed to receive a screw driver, the other end of the passage being internally threaded, a bushing seated in the internal threads of the passage, the bore through said bushing being enlarged at the outer end thereof to form a seat for a socket wrench, a plunger having a head slidably seated within said passage, the portion of the plunger behind the head thereof being reduced in diameter to form a stem slidably seated within the bushing, a compression spring on the stem urging outward projecting movement of the plunger head, and means within the body for limiting said outwardly projecting movement of the plunger head, the stem of the plunger being of a length never to project beyond the rear end of the body.

References Cited in the file of this patent

UNITED STATES PATENTS

| Number | Name | Date |
| --- | --- | --- |
| 883,869 | Fortin | Apr. 7, 1908 |
| 1,833,695 | Swartz | Nov. 24, 1931 |
| 2,369,319 | Smith | Feb. 13, 1945 |
| 2,470,254 | Lee | May 17, 1949 |
| 2,531,317 | Baney et al. | Nov. 21, 1950 |